US006598897B1

(12) United States Patent
Patti (10) Patent No.: US 6,598,897 B1
(45) Date of Patent: *Jul. 29, 2003

(54) APPARATUS FOR ATTACHING A TOWING DEVICE TO A VEHICLE

(76) Inventor: Anthony J. Patti, 7571 Bluff View Way, Reno, NV (US) 89506

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/664,611

(22) Filed: Sep. 18, 2000

Related U.S. Application Data

(60) Provisional application No. 60/191,013, filed on Mar. 21, 2000, and provisional application No. 60/154,421, filed on Sep. 17, 1999.

(51) Int. Cl.[7] .............................. B60D 1/06; B60D 1/07; B60D 1/52
(52) U.S. Cl. ...................... 280/507; 280/478.1; 280/504
(58) Field of Search ................................. 280/504, 507, 280/509, 478.1, 479.1; 224/519, 521; D12/162

(56) References Cited

U.S. PATENT DOCUMENTS

| 1,883,696 A | * | 10/1932 | Goertz |
| 2,685,468 A | * | 8/1954 | Blocker |
| 3,782,761 A | * | 1/1974 | Cardin ........................ 280/507 |
| 3,981,517 A | * | 9/1976 | Crochet ................... 280/478 R |
| 4,077,234 A | * | 3/1978 | Crochet ....................... 64/17 R |
| 4,418,936 A | * | 12/1983 | Adams ......................... 280/493 |
| 5,423,566 A | * | 6/1995 | Warrington et al. ..... 280/415.1 |
| 5,730,456 A | * | 3/1998 | Bowers ....................... 280/507 |

FOREIGN PATENT DOCUMENTS

| DE | 3703626 A1 | * | 8/1988 |
| DE | 3927423 A1 | * | 2/1991 |
| EP | 0455251 A2 | * | 5/1991 |
| FR | 2673891 A1 | * | 3/1991 |

* cited by examiner

*Primary Examiner*—Brian L. Johnson
*Assistant Examiner*—Christopher Bottorff
(74) *Attorney, Agent, or Firm*—Townsend and Townsend and Crew LLP (57) ABSTRACT

An apparatus for attaching a towing device having two retractable pins on opposing sides for engaging within two apertures formed in a receiving member. A first end of the apparatus for attaching a towing device is generally box-like shape and is dimensioned to be received within the receiving member. The second end of the apparatus for attaching a towing device has a towing device attachment for attaching a trailer thereto. Once the first end is slid within the receiver and the pins of the apparatus for attaching a towing device are aligned with the apertures of the receiving member, the pins are then actuated to an extended locked position, thereby securing the apparatus for attaching a towing device to the receiving member. To remove the apparatus for attaching a towing device from the receiving member, the pins are simply actuated to a retracted position, and the apparatus for attaching a towing device is slid therefrom.

16 Claims, 6 Drawing Sheets

SECTION E-E

SECTION A-A
FIG. 2

SECTION A-A
FIG. 3

APPARATUS FOR ATTACHING A TOWING DEVICE TO A VEHICLE

CROSS REFERENCE TO RELATED APPLICATIONS

This application claims priority of and incorporates by reference U.S. provisional application Nos. 60/154,421, filed on Sep. 17, 1999 and 60/191,013, filed on Mar. 21, 2000.

TECHNICAL FIELD

The present invention relates generally to hitching devices, and more specifically, to an apparatus for attaching a towing device to a vehicle.

BACKGROUND

The practice of pulling a detachable trailer behind a vehicle is universally popular. Trailers are utilized to haul a multitude of items such as, for example, boats, cars, motorcycles, electric wheelchairs, animals, lawn maintenance equipment and other items that would be undesirable to place in, or would be unpractical for, a typical vehicle. The use of vehicle-pulled trailers has also become popular for applications such as mobile advertising billboards and mobile tool/equipment servicing facilities. Because of the enormous use and popularity of trailers, any improvement thereto can prove to be a tremendous social benefit. In addition to trailers, other objects, such as vehicle tow bars, are frequently attached to vehicles for towing.

To connect a detachable object to a vehicle, traditionally, a ball-hitch was permanently connected to the rear underframe of the vehicle via welds and/or bolts. Subsequently, this common attachment apparatus/method was improved and is now typically replaced with a box-like receiving member fixed to the under-frame of the vehicle. The box-like receiving member typically has a generally rectangular channel and at least two aligned apertures positioned on opposing sides thereof for aligning with either two apertures formed in a smaller box-like attaching member of the trailer or with two apertures formed in a towing device adapter. A towing device adapter is typically a member having a ball hitch on one end and a box-like second end, wherein the box-like end has at least two opposing apertures, and wherein the box-like end extends into the rectangular channel of the receiving member and the apertures of the adapter align with the apertures of the receiving member. A securing pin is then extended through the respective apertures thereby securing the adapter to the receiving member.

However, in view of the present invention, this type of securing means is disadvantageous. For instance, during use, the securing pin can suffer tremendous perpendicular and vibration forces. As a result, the pin can become dislodged from the apertures thus causing the trailer and its load to become separated. Consequently, an extremely dangerous road hazard can result.

It is known within the art to extend a small pin through a pinhole formed at the distal end of the securing pin for helping to prevent the disengagement of the securing pin. However, the small pin can often break and/or become disengaged itself, thereby eliminating any additional securing benefit. An additional disadvantage is that both pins must be completely removed from the respective aperture in order to remove the adapter from the receiving member. As a result, this method is time consuming and thus inefficient. Moreover, because the pins are not formed as an integral part of the adapter, the pins are often lost or misplaced.

It is therefore readily apparent that a new and improved apparatus for attaching a towing device is needed that adequately secures the apparatus to a receiving member, reduces the likelihood of dangerous accidental disengagements and can be easily secured or unsecured thereto. It is, therefore, to the provision of such an improvement that the present invention is directed.

BRIEF SUMMARY OF THE INVENTION

Briefly described, in a preferred embodiment, the present invention both overcomes the above-mentioned disadvantages, and meets the recognized needs for such a device, by providing an apparatus for attaching a towing device having two retractable pins on opposing sides for engaging within two apertures formed in a receiving member. A first end of the apparatus for attaching a towing device is generally a box-like shape and is dimensioned to be received within the box-like receiving member. The second end of the apparatus for attaching a towing device has a towing device attachment for attaching a trailer thereto. Once the first end is slid within the receiver and the pins of the apparatus for attaching a towing device are aligned with the apertures of the receiving member, the pins are then actuated to an extended locked position, thereby securing the apparatus for attaching a towing device to the receiving member. To remove the apparatus for attaching a towing device from the receiving member, the pins are simply actuated to a retracted position, and the apparatus for attaching a towing device is slid therefrom.

Several embodiments are disclosed for actuating the extension and retraction of the pins. In the preferred embodiment, a cam having a raised area and a longitudinally located recessed area is positioned within the apparatus for attaching a towing device, wherein the cam is engaged with an exterior knob. The cam is in contact with the two pins such that when the knob is slid in the longitudinal direction, the cam also slides in a longitudinal direction thereby placing the pins within the raised area (extended position) or the recessed area (retracted position) as desired.

As an alternate embodiment, a rotatable cam is disclosed wherein an exterior positioned knob can be rotated to produce a caming affect on the pins, thus retracting or extending the pins as desired based on the radial position of the knob.

As an additional alternate embodiment, a rotatable knob is provided that manipulates the longitudinal movement of a cam and thus the pins via a rack and gear assembly. The rotation of the knob rotates a concentric gear with teeth that are engaged with the teeth of a gear rack. The gear rack is fixed to a cam, as found in the preferred embodiment. As the knob is rotated, the gear rack and thus the cam are longitudinally slid to the retracted or extended position as desired.

Consequently, a feature and advantage of the present invention is to provide a new and improved apparatus for attaching a towing device.

A feature and advantage of the present invention is to provide a new and improved apparatus for attaching a towing device that can be easily and safely secured to a receiving member.

A feature and advantage of the present invention is to provide a new and improved apparatus for attaching a towing device that is removable.

A feature and advantage of the present invention is to provide a new and improved apparatus for attaching a towing device having two retractable/extendable pins for engaging apertures formed within the receiving members.

A feature and advantage of the present invention is to provide a new and improved apparatus for attaching a towing device having two retractable/extendable pins that are actuated via an exterior knob and a sliding cam.

A feature and advantage of the present invention is to provide a new and improved apparatus for attaching a towing device having two retractable/extendable pins that are actuated via an exterior knob and a rotatable cam.

A feature and advantage of the present invention is to provide a new and improved apparatus for attaching a towing device having two retractable/extendable pins that are cam actuated via an exterior knob, a gear and a gear rack.

A feature and advantage of the present invention is to provide a new and improved apparatus for attaching a towing device that has a removable knob to reduce the likelihood of unauthorized or unintentional disconnection.

These and other objects, features and advantages of the present invention will become more apparent to one skilled in the art by reference to the following detailed description of the preferred and alternate embodiments, the appended claims, and the accompanying drawings.

BRIEF DESCRIPTION OF THE FIGURES

The present invention will be better understood by reading the Detailed Description of the Preferred Embodiment with reference to the accompanying drawing figures, in which like reference numerals denote similar structure and refer to like elements throughout, and in which.

DETAILED DESCRIPTION OF THE PREFERRED EMBODIMENT

In describing the preferred and alternate embodiments of the present invention illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

With regard to all such embodiments as may be herein described and contemplated, it will be appreciated that optional features, including, but not limited to, aesthetically pleasing coloration and surface design, and labeling and brand marking, may be provided in association with the present invention, all without departing from the scope of the invention.

Figures 1A, 1B:
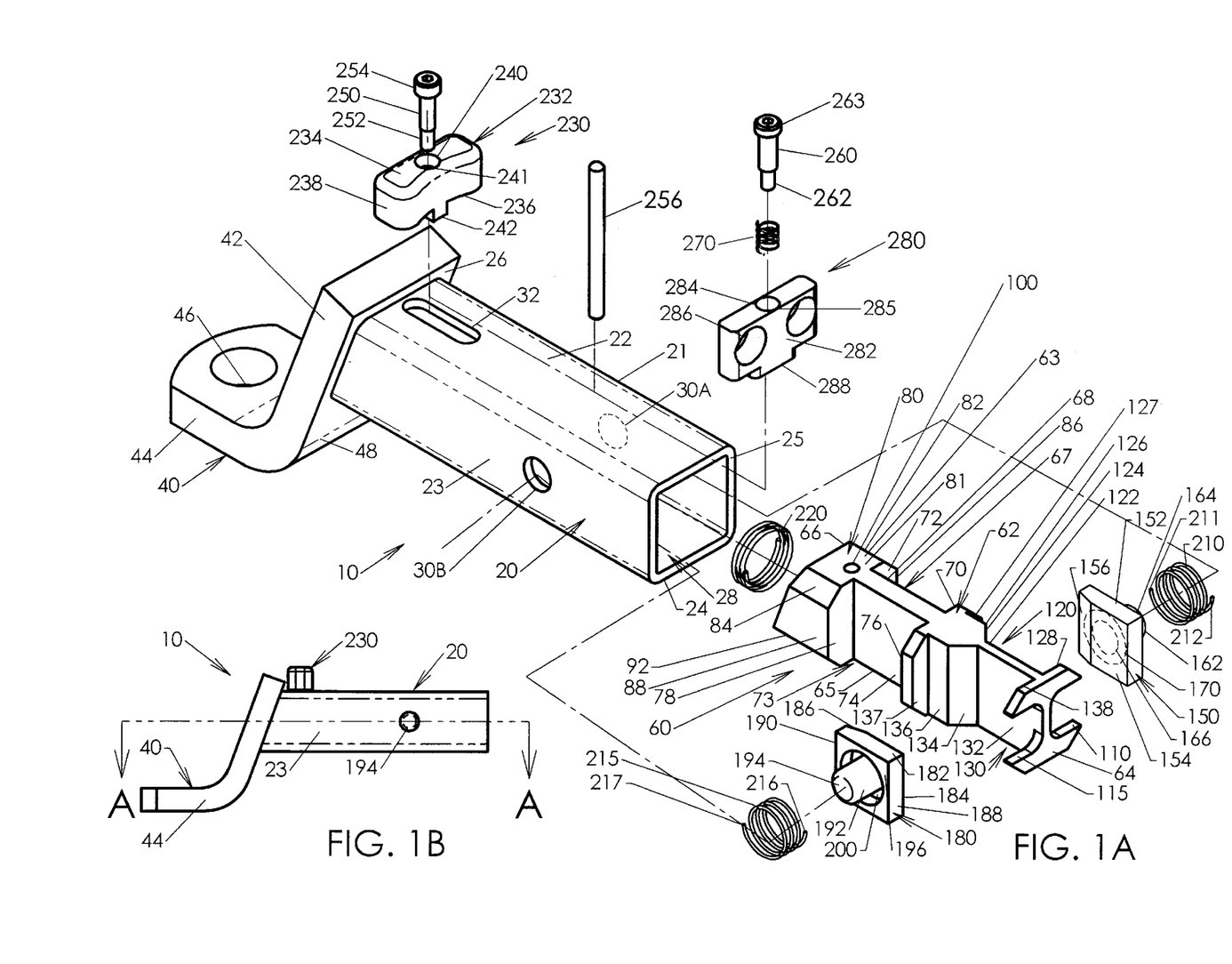
FIG. 1A is a perspective exploded view of the apparatus for attaching a towing device according to the preferred embodiment of the present invention.
FIG. 1B is a side view of the apparatus for attaching a towing device shown in FIG. 1A.
Figure 2:
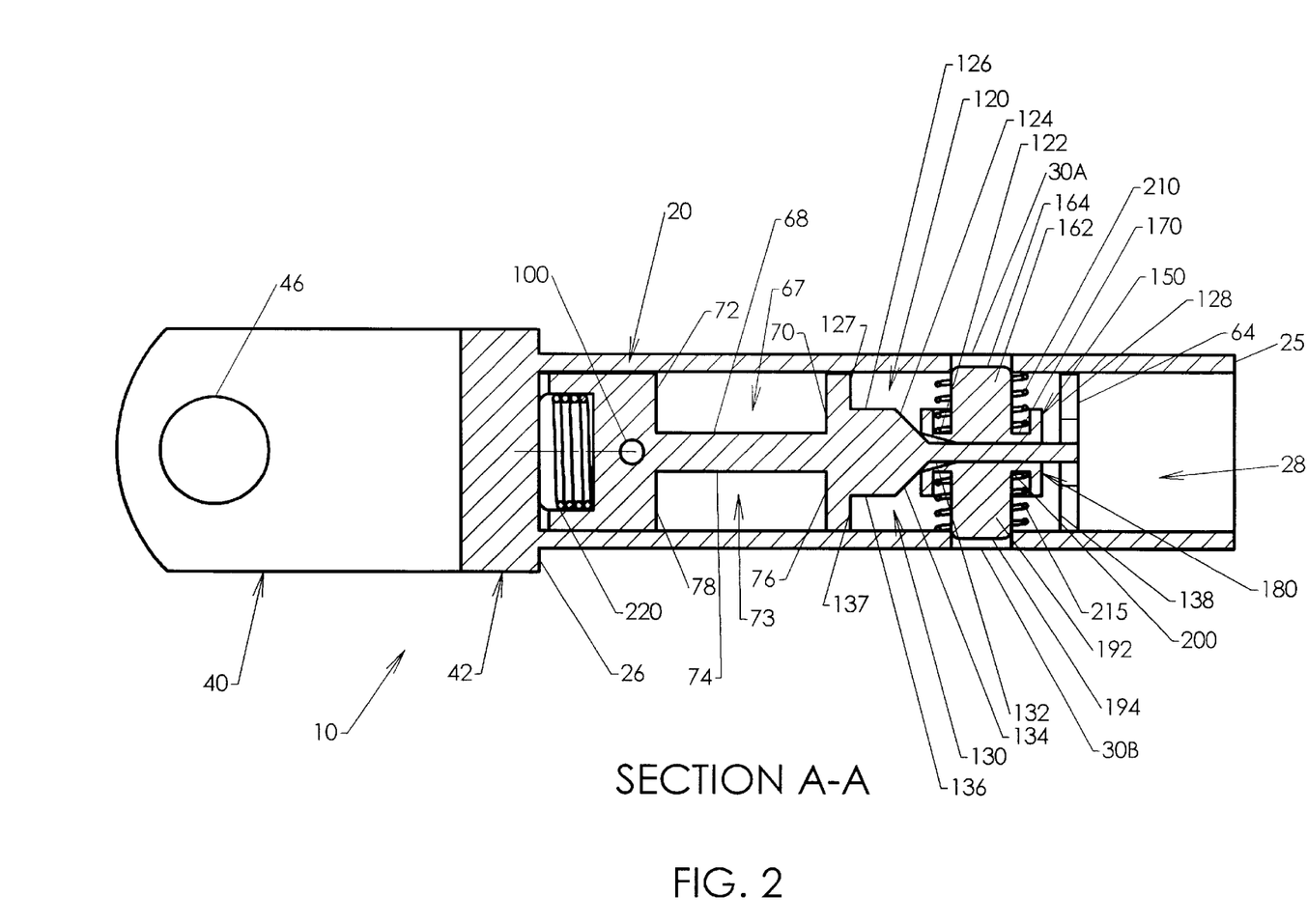
FIG. 2 is sectional view along line A—A of the apparatus for attaching a towing device of FIG. 1 showing the pins in a retracted position.
Figure 3:
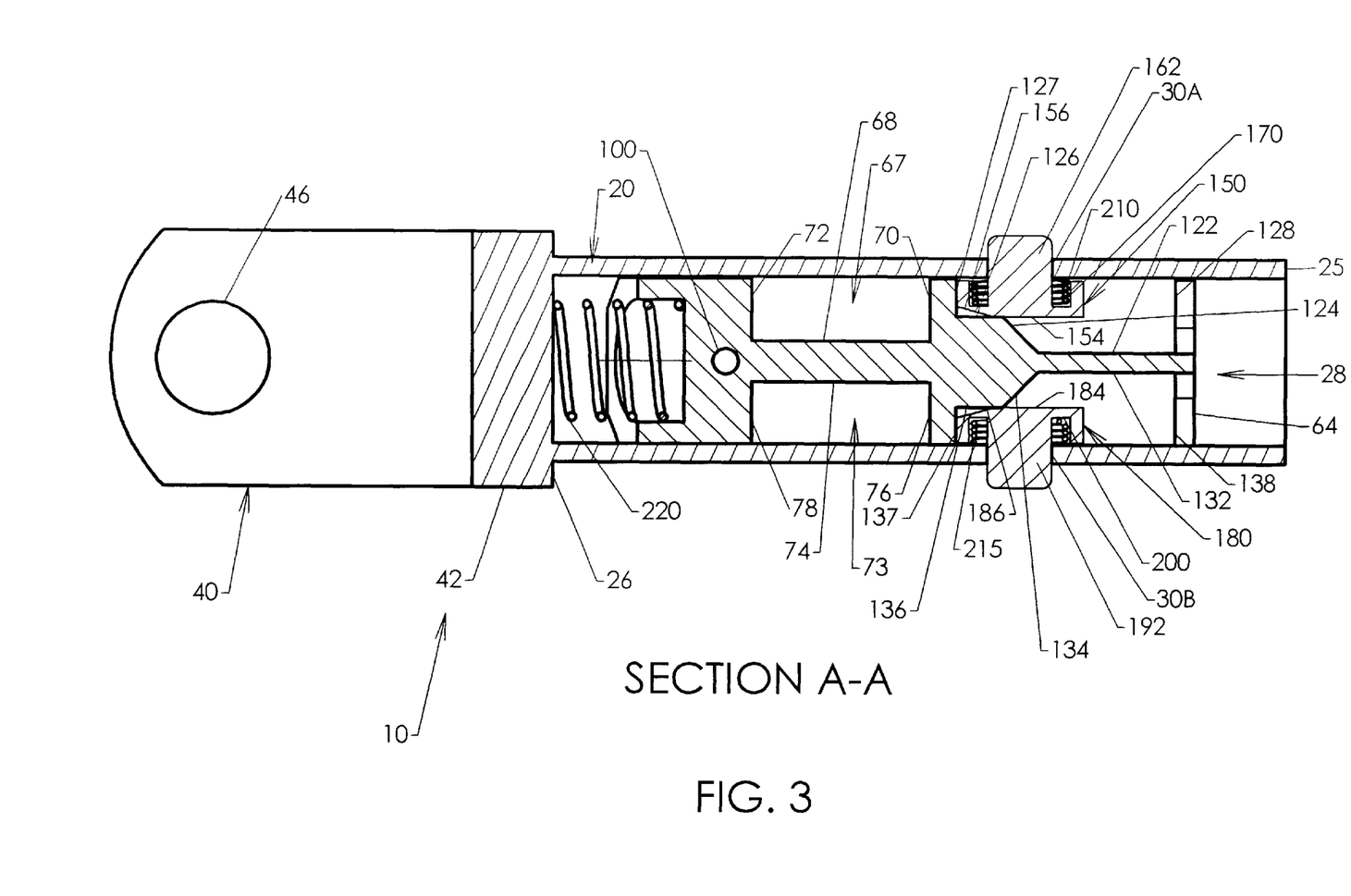
FIG. 3 is sectional view along line A—A of the apparatus for attaching a towing device of FIG. 1 showing the pins in an extended position.

As shown in FIGS. 1–3, in the preferred embodiment, apparatus for attaching a towing device 10 generally comprises shell 20, trailer hitch 40 and locking mechanism assembly 60. More specifically, shell 20 is preferably an elongated rectangular cross-sectional shaped member defined by first wall 21, second wall 22, third wall 23, fourth wall 24, first end 25 and second end 26. As such, walls 21, 22, 23, 24 define a generally square shaped channel 28 therebetween, wherein channel 28 is dimensioned for receiving cam 62 as more fully described below. Second end 26 of shell 20 is attached to upright leg 42 of generally L-shaped trailer hitch 40 preferably by welding or any known means within the art. Second end 26 is preferably angled relative to walls 22, 24 to match the angle upright leg 42 extends from horizontal leg 44 such that when shell 20 is attached to the receiver, horizontal leg 44 is held at an approximately horizontal position.

First locking pin aperture 30a and second locking pin aperture 30b are formed through first wall 21 and third wall 23, respectively. First pin locking aperture 30a and second pin locking aperture 30b are dimensioned for receiving pins 162 and 192, respectively, of locking mechanism assembly 60, as more fully described below. First pin locking aperture 30a and second pin locking aperture 30b are preferably positioned directly across from and aligned with each other. Formed through second wall 22 proximal to second end 26 is release knob slot 32. Release knob slot 32 is dimensioned to slideably receive release knob 230, as more fully described below.

Locking mechanism assembly 60 generally comprises cam member 62, first hitch pin 162, second hitch pin 192, first pin spring 210, second pin spring 215 and third cam spring 220. More specifically, cam member 62 is formed having an upper surface 63, a first end 64, a lower surface 65, and a second end 66, wherein release pin attaching block 80 is formed at second end 66, first recessed area 67 and second recessed area 73 are formed adjacent thereto, and wherein first hitch pin cam area 120 and second hitch pin cam area 130 are formed adjacent to first recessed area 67 and second recessed area 73, respectively, and proximal to first end 64. First end 64 of cam 62 is preferably I-shaped having generally first C-shaped cut out section 110 and second generally C-shaped cut out section 115. First recessed area 67 is defined by facing wall 68, first end wall 70 and second end wall 72, wherein first end wall 70 and second end wall 72 extend generally perpendicular from and on opposing ends of facing wall 68. Second recessed area 73 is preferably positioned opposite first recessed area 67 and is defined by facing wall 74, first end wall 76 and second end wall 78, wherein first end wall 76 and second end wall 78 extend generally perpendicular from and on opposing ends of facing wall 74. First recessed area 67 and second recessed area 73 are cut out or formed in cam member 62 to reduce the weight of cam member and thus the overall weight of apparatus for attaching a towing device 10.

Release pin attaching block 80 is generally rectangular and is defined by upper wall 81, first side wall 82, second side wall 84, third side wall 86, fourth side wall 88, end wall 90 and lower wall 92, wherein first side wall 82 and second side wall 84 extend downward from upper wall 81 and are positioned on opposing sides of upper wall 81. Third side wall 86 generally extends from first side wall 82 and is preferably approximately perpendicular to upper wall 81; fourth side wall 88 extends from second side wall 84 and is positioned preferably approximately perpendicular to upper wall 81. Lower wall 92 is preferably parallel with upper wall 81 and connects third side wall 86 and fourth side wall 88. End wall 90 is preferably angled to match the angle of upright leg 42 of generally L-shaped trailer hitch 40, as more fully described below. Formed in upper wall 81, preferably in the center thereof, is release pinhole 100. Release pinhole 100 is dimensioned for receiving and securing screw 250 of hitch lock release knob 230 therein.

First hitch pin cam area 120 and second hitch pin cam area 130 serve to manipulate hitch pins 162 and 192, respectively in an extended and retracted position within first pin locking aperture 30a and second pin locking aperture 30b, respectively. First hitch pin cam area 120 is defined by first wall 122, second wall 124, third wall 126, fourth wall 127 and fifth wall 128, wherein fifth wall 128 extends generally perpendicular from one end of first wall 122, and wherein second wall 124 generally extends at the opposing end of first wall 122 generally at an obtuse angle therefrom. Third wall 126 extends from second wall 124 and is preferably parallel with first wall 122. Fourth wall 127 extends from third wall 126 and is preferably perpendicular thereto.

Second hitch pin cam area 130 is defined by first wall 132, second wall 134, third wall 136, fourth wall 137 and fifth wall 138, wherein fifth wall 138 extends generally perpendicular from one end of first wall 132, and wherein second wall 134 generally extends at the opposing end of first wall 132 generally at an obtuse angle therefrom. Third wall 136 generally extends from second wall 134 and is generally parallel with first wall 122. Fourth wall 137 generally extends from third wall 136 and is preferably perpendicular thereto. As more fully described below, second wall 124 of first hitch pin cam area 120 and second wall 134 of second hitch pin cam area 130 serve as a transitional ramp between third wall 126 and first wall 122 of first hitch pin cam area 120 and third wall 136 and first wall 132 of second hitch pin cam area 130, respectively. First pin block 150 of first pin 162 rests within first hitch pin cam area 120, wherein first pin block 150 is manipulated to a first extended position or a second recessed positioned. More specifically, in an extended position first pin block 150 rests on third wall 126, and when in the retracted position, first pin block 150 rests on first wall 122, such that as cam 62 is moved, first pin block 150 slides up or down second wall 124 to either an extended position resting on third wall 126 or in a retracted position resting on first wall 122. Fourth wall 127 and fifth wall 128 serve as a stop for first pin block 150.

Second pin block 180 of second pin 192 rests within second hitch pin cam area 130, wherein second pin block 180 is manipulated to a first extended position or a second recessed positioned. More specifically, in an extended position second pin block 180 rests on third wall 136, and when in the retracted position, second pin block 180 rests on first wall 132, such that as cam 62 is moved, second pin block 180 slides up or down second wall 134 to either an extended position resting on third wall 136 or a retracted position resting on first wall 132. Fourth wall 137 and fifth wall 138 serve as a stop for second pin block 180.

First pin 162 preferably has a first end 164 and a second end 166, wherein second end 166 is affixed to pin block 150. A recessed area 170 is formed in first pin block 150 around second end 166 of first pin 162 for receiving first end 211 of first pin spring 210, wherein first pin spring 210 is concentrically positioned over first pin 162 with first end 211 of first pin spring 210 resting against first pin block 150 and within recessed area 170. Recessed area 170 is formed generally on the outwardly facing wall of first pin block 150. First pin block 150 is further defined by having upper wall 152, contact wall 154, angled wall 156, first side wall 158 and second side wall 160, wherein contact wall 154 rests within first hitch pin cam area 120 and either against first wall 122 or third wall 126 depending on the longitudinal positioning of cam 62. Angled wall 156 is preferably angled at approximately the same angle as second wall 124 of first hitch pin cam area 120 to facilitate the transition between the recessed position or the extended position of first pin 162, the functionality of which will be more fully described below. First end 211 of pin spring 210 rests within recessed area 170 and against first pin block 150, wherein second end 212 of first pin spring 210 rest against the interior of shell 20 such that first pin spring 210 urges first pin block 150 and thus first pin 162 against cam 62.

Second pin 192 preferably has a first end 194 and a second end 196, wherein second end 196 is affixed to second pin block 180. A recessed area 200 is formed in second pin block 180 around second end 196 of second pin 192 for receiving first end 216 of second pin spring 215, wherein second pin spring 215 is concentrically positioned over second pin 192 with first end 216 of second pin spring 215 resting against second pin block 180 and within recessed area 200. Recessed area 200 is formed generally on the outwardly facing wall of second pin block 180. Second pin block 180 is further defined by having upper wall 182, contact wall 184, angled wall 186, first side wall 188 and second side wall 190, wherein contact wall 184 rests within second hitch pin cam area 130 and either against second wall 132 or third wall 136 depending on the longitudinal positioning of cam 62. Angled wall 186 is preferably angled at approximately the same angle as second wall 134 of second hitch pin cam area 130 to facilitate the transition between the recessed position or the extended position of second pin 192, the functionality of which will be more fully described below. First end 216 of second pin spring 215 rests within recessed area 200 and against second pin block 180, wherein second end 217 of second pin spring 215 rest against the interior of shell 20 such that second pin spring 210 urges second pin block 180 and thus second pin 192 against cam 62.

L-shaped apparatus for attaching a towing device member 40 comprises an upright leg 42 and a generally horizontal leg 44 extending therefrom. Upright leg 42 is positioned at a slight obtuse angle from generally horizontal member 44 to provide clearance from ball member 12 of ball assembly 11, as more fully described below. A hole 46 is formed approximately in the center of generally horizontal member 44 for receiving and securing the neck 17 of ball assembly 11. Ball assembly 11 comprises a ball member 12, a neck section 17 extending downwardly therefrom and a lip 18 extending around the perimeter of neck section 17. Ball assembly 11 is attached to L-shaped apparatus for attaching a towing device 40 by extending neck section 17 through throughhole 46, wherein lip 18 rests against the upper surface of horizontal leg 44, and wherein nut 14 is threaded on the underside of horizontal leg 44 and onto the distal threaded end of neck section 17 thereby securing ball assembly 11 to L-shaped apparatus for attaching a towing device 40. A pin hole 16 is formed at the distal end of neck section 17 for receiving a retention pin (not shown) for further ensuring that nut 14 remains attached to neck member 18 and that ball assembly 11 remains secured to L-shaped trailer hitch 40. When locking hitch apparatus 10 is attached to receiving member A, a ball 12 is generally held a horizontal position. As previously mentioned, upright leg 42 is angled back and away from ball member 12 to facilitate the attachment of and to prevent interference with a trailer ball receiving capture joint (not shown) of a typical trailer (not shown).

To manipulate cam 60 and thus first and second locking pins 162, 192, a hitch lock release mechanism 230 is provided. In the preferred form, hitch lock release mechanism 230 comprises a release knob 232 defined by having an upper wall 234, lower wall 236, peripheral wall 238 and a protrusion 242, wherein protrusion 242 extends downward from lower wall 236 and is generally rectangular shaped. Protrusion 242 is dimensioned to be slideably received within release knob slot 32 of shell 20. A hole 240 is formed generally through the center of release knob 232 and is dimensioned for receiving screw 250 therethrough. Screw 250 generally has a head 254 and a threaded distal end 252. A recessed area 241 is formed at the upper portion of the hole 240 in upper wall 234 for ensuring that head 254 of screw 250 is recessed therein. Distal end 252 of screw 250 is extended through release knob 232 and engages within release pin hole 100 of release pin attaching block 80 of locking mechanism assembly 60. Threads [not shown] are formed within release pin hole 100 for securing release knob 232 to locking mechanism assembly 60. Alternatively, screw 250 may be a pin that is frictionally secured within release pin hole 100. Protrusion 242 of release knob 232 is slideably engaged within release knob slot 32 such that release knob 232 can be slid within release knob slot 32.

Although release knob 232 is the preferred maneuvering mechanism, as shown in FIG. 1, other embodiments of a lock release mechanism 230 are contemplated. For instance, removable release pin 256 may be utilized in lieu of release knob 232, wherein removable release pin 256 is simply inserted through release knob slot 32 and into release pin hole 100 and then removable release pin 256 may be slid into a locked or unlocked position. Once cam 60 is in the desired position, removable release pin 256 can be removed. As such, the use of removable pin 256 makes it more difficult for someone accidentally or intentionally to disengage apparatus for attaching a towing device 10 from receiving member A and thus, increases the security and safety of apparatus for attaching a towing device 10. As an additional alternate embodiment for hitch lock release mechanism 230, a release and locking knob 280 is provided, wherein release and locking knob 280 comprises a central downward extending portion 282, a base portion 288, and a finger hole 286. A recessed area 285 is provided at the upper surface at the hole 284 for receiving the head 263 of pin 260. A spring 270 is positioned between pin 260 and within recessed area 285 of release and locking knob 280 for urging release and locking knob 280 in a downward direction once pin 260 is secured within release pin hole 100. Pin 260 may be frictionally secured or have a threaded portion for engaging threads (not shown) within release pin hole 100. As such, release and locking knob 280 must be lifted from contact with shell 20 to slide release and locking knob 280 and locking mechanism assembly 60. One or more finger holes 286 are provided for assisting a user to lift locking knob 280. Release and locking pin 280 can also be rotated so that its longitudinal axis is parallel with the longitudinal axis of hole 32. This allows base portion 288 to be inserted in hole 32, the sides of the base portion abutting the sides of the hole, thereby locking mechanism assembly 60 in place.

Figure 4:
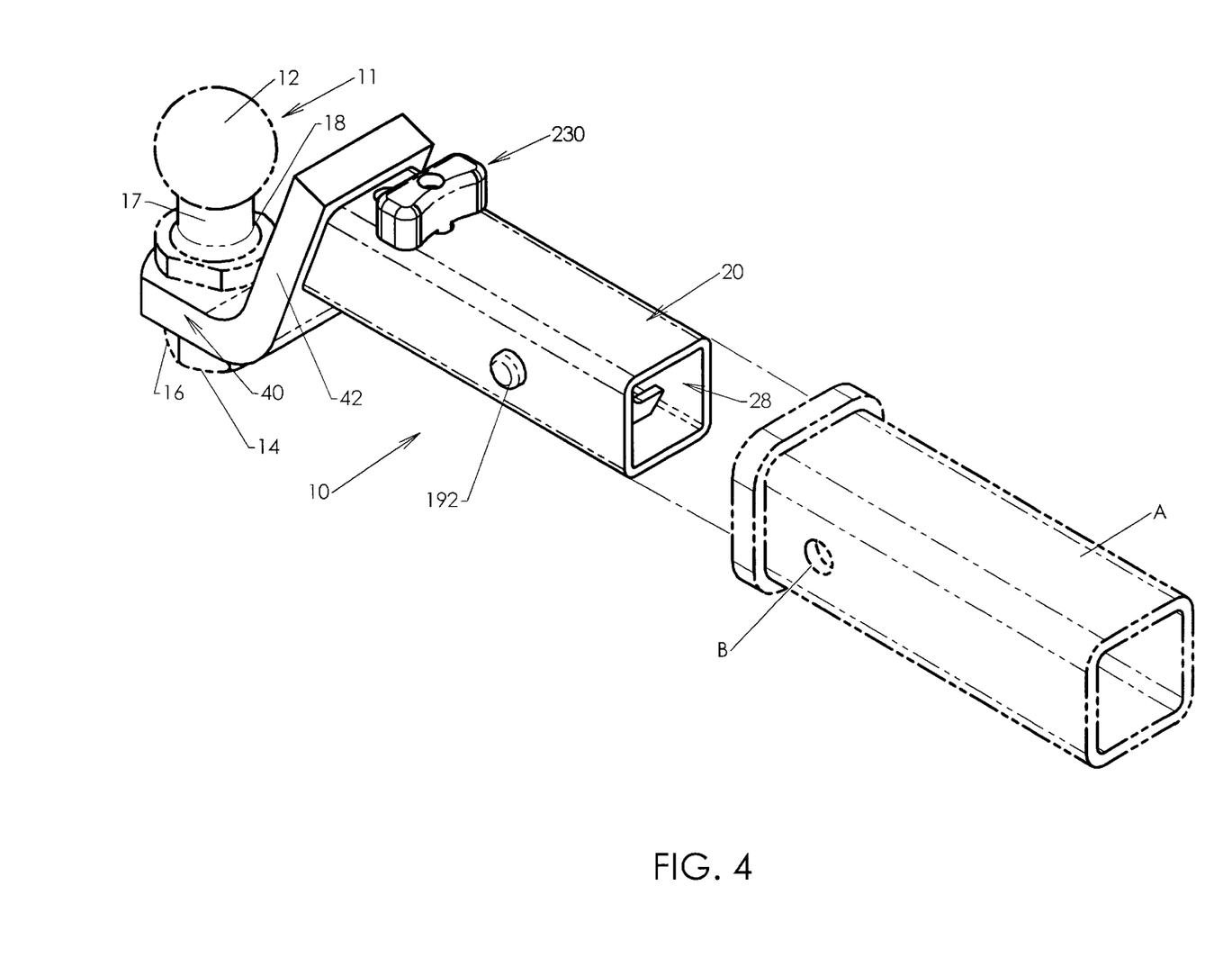
FIG. 4 is a perspective view of the apparatus for attaching a towing device according to a preferred embodiment of the present invention and a partial view of a receiving member shown in a separated position.

In use, locking mechanism assembly 60 is inserted through channel 28 of shell 20 with a cam spring 220 positioned along end wall 190 of cam 62 such that cam spring 220 rests between upright leg 42 of L-shaped apparatus for attaching a towing device 40 and end wall 190, wherein cam spring 220 urges cam 62 away from upright wall 42 of L-shaped apparatus for attaching a towing device 40. Screw 250 is inserted into the hole 240 of the lock release knob 230 and threaded into release pin hole 100, wherein rectangular shaped protrusion 242 of lock release knob 230 is slideably received within release knob slot 32 of shell 20. Cam spring 220 urges cam 62 and thus lock release knob 230 to the locked 33 position within release knob slot 32 such that pins 162 and 192 extend through first pin locking aperture 30a and second pin locking aperture 30b, respectively. When cam 62 is in the locked position 33, first pin block 150 and second pin block 180 rests against wall 126 of first towing apparatus pin cam area 120 and wall 136 of second towing apparatus pin cam area 130, respectively. As best seen in FIG. 4, prior to sliding apparatus for attaching a towing device 10 onto receiving member A, lock release knob 230 is slid toward towing apparatus 40, thereby allowing first pin block 150 and second pin block 180 to slide down ramp 124 and ramp 134, respectively, and onto wall 122 and 132, respectively, of first towing apparatus pin cam area 120 and second towing apparatus pin cam area 130, respectively. Consequently, first pin spring 212 urges first pin 162 onto wall 122 and thus is retracted from first pin locking aperture 30a; likewise, second pin spring 215 urges second pin 192 onto well 132 and thus, is retracted from second pin locking aperture 30b.

After shell 20 is slid within the receiving member A and first pin locking aperture 30a and second pin locking aperture 30b are aligned with apertures B within the receiving member A, towing apparatus lock release knob 230 can then slide back to the locked position 32 such that first pin block 150 and second pin block 180 slide up ramp 124 and 134, respectively, and onto walls 126 and 136, respectively, of first towing apparatus pin cam area 120 and second towing apparatus pin cam area 130, respectively, thereby extending pins 162 and 192 through first pin locking aperture 30a and second pin locking aperture 30b, respectively, and through the respective apertures of the receiving member A, thus locking towing apparatus 10 thereto. To remove locking towing apparatus 10, towing apparatus lock release knob 230 is again simply slid to the unlocked 34 position thereby recessing pins 162 and 192 and thus allowing the apparatus for attaching a towing device 10 to be removed from receiving member A.

Figure 5:
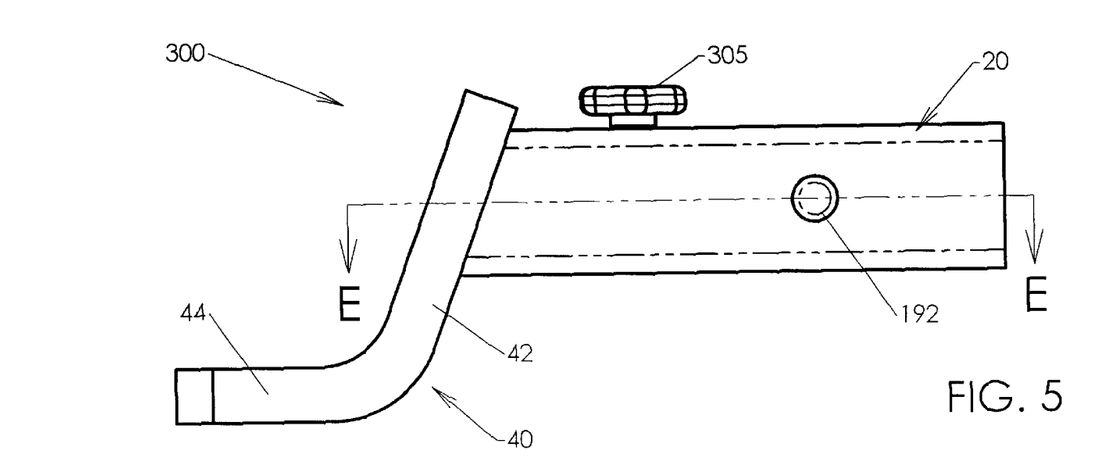
FIG. 5 is a side view of the apparatus for attaching a towing device according to a first alternate embodiment of the present invention.
Figure 6:
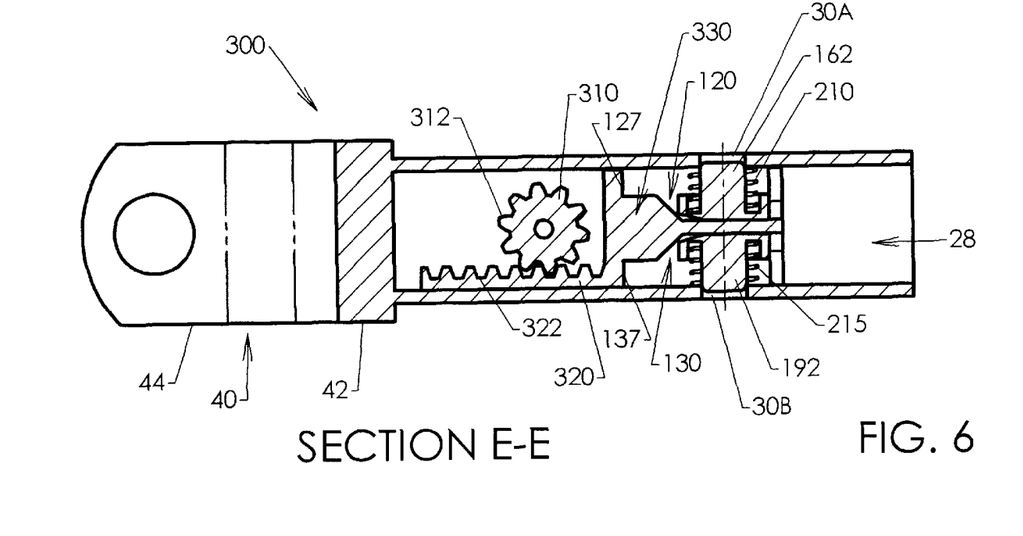
FIG. 6 is a sectional view along line E—E of the apparatus for attaching a towing device of FIG. 5.

In reference to FIGS. 5–6, an alternate embodiment 300 is shown having the same first towing apparatus pin cam area 120 and second towing apparatus pin cam area 130 for manipulating pins 162 and 192 in the extended position through or the recessed position from first pin locking aperture 30a and second pin locking aperture 30b, respectively. However, cam 330 is longitudinally moved via turn knob 305, drive gear 310 and gear rack 320. Gear rack 320 is attached to or formed as an integral tail of cam 330, wherein teeth 322 are vertically positioned such that gear rack 320 is engagable with horizontally held gears. Turn knob 305 is attached to drive gear 310, wherein drive gear 310 has a plurality of gear teeth 312 dimensioned for engaging teeth 322 of gear rack 320. As turn knob 305 is rotated, the rotational force of drive gear 310 is transferred to gear rack 320 via teeth 312 and teeth 322. As a result, gear rack 320 and thus cam 330 moves longitudinally thereby manipulating the movement of pins 162 and 192.

Figure 7:
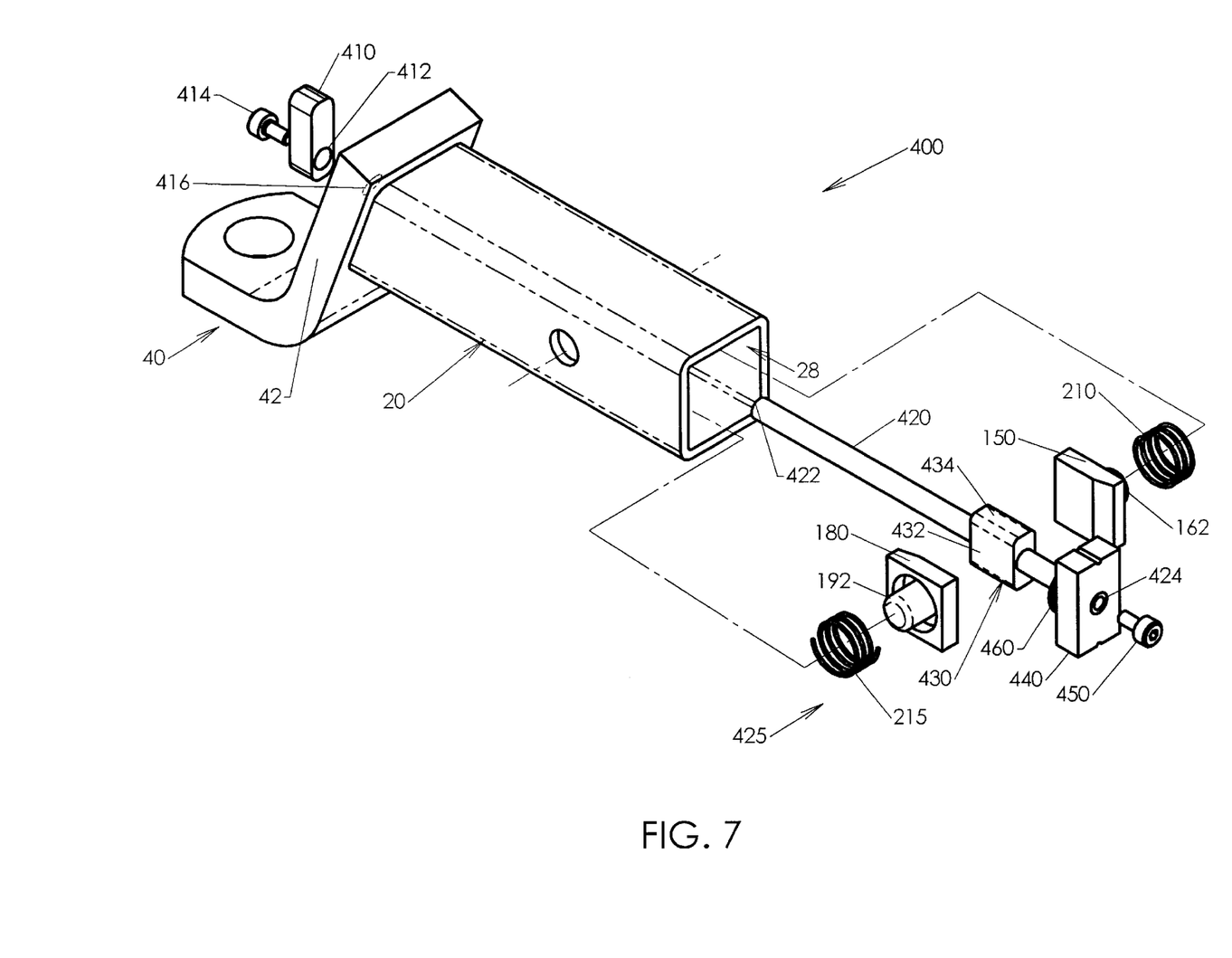
FIG. 7 is a perspective exploded view of the apparatus for attaching a towing device according to a second alternate embodiment of the present invention.

Now referring to FIG. 7, alternate embodiment 400 is shown having a rotating cam 430 for controlling the movement of pins 162 and 192. Alternate embodiment 400 generally comprises shell 20, apparatus for attaching a towing device 40 and locking mechanism 425. Locking mechanism 425 comprises knob 410, shaft 420, cam 430, guide 440 and securing screw 450. Shaft 420 is dimensioned to extend approximately the length of shell 20 such that a first end 422 of shaft 420 extends through an aperture 416 formed in upright leg 42 of apparatus for attaching a towing device 40, and a second end 424 attaches to a guide 440. First end 422 is secured within channel 412 of knob 410 via screw 414. Second end 424 is secured to guide 440 via screw 450. It should be noted that screws 414 and/or 450 may be pins that frictionally fit within the respective ends of shaft 420. Guide 440 is dimensioned to snugly fit within channel 28 of shell 20 to hold shaft 420 and cam 430 generally at the center of channel 28. Cam 430 is fixed to and carried concentrically along shaft 420 at a longitudinal position aligned with first pin block 150 and second pin block 180. Cam 430 has preferably a rectangular cross-section having short sides 434 and elongated sides 432. When cam 430 is in a position such that elongated sides 432 face first pin block 150 and second pin block 180, cam 430 is not in contact therewith. As such, first pin spring 210 and second pin spring 215 urge pins 162 and 192, respectively, against elongated sides 432, and thus, are in a recessed position. A ninety-degree rotation of knob 410 rotates shaft 420 and thus cam 430 ninety degrees. Consequently, the elongated sides 432 of cam 430 are generally horizontal, and first pin block 150 and second pin block 180 are in contact with short sides 434. Thus, pins 162 and 192 are moved to an extended position. Torsion spring 460, attached to guide 440 and shaft 420, is provided to bias cam 430 to its horizontal position.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An apparatus for attaching a towing device to a receiving member of a vehicle, the receiving member having at least one aperture, the apparatus comprising:

a hollow tube configured to be inserted into the receiving member of the vehicle, the hollow tube including a wall defining a channel and at least one pin aperture through the wall into the channel, the hollow tube including a release knob aperture through the wall of the hollow tube;

at least one pin carried by the hollow tube and disposed at least partially within the channel, the at least one pin being aligned with the at least one pin aperture of the hollow tube;

a cam having at least one cam surface slidably coupled with the at least one pin, the cam being movable inside the channel of the hollow tube between a retracted position and an extended position, the at least one cam surface slidably guiding the at least one pin to extend and protrude through the at least one pin aperture in the extended position, the at least one cam surface slidably guiding the at least one pin to retract into the channel in the retracted position, wherein the hollow tube is configured to be inserted into the receiving member of the vehicle to align the at least one pin aperture of the channel with the at least one aperture of the receiving member when the cam is in the retracted position with the at least one pin retracted into the channel, such that the at least one pin extends and protrudes through the one aperture of the receiving member which is aligned with the at least one pin aperture of the channel when the cam is in the extended position;

a drive gear and a gear rack operatively coupled with the drive gear, the gear rack being attached to the cam; and a release knob connected to the drive gear inside the channel of the hollow tube and protruding through the release knob aperture to outside of the hollow tube, the release knob comprising a turn knob connected to the drive gear, the turn knob being rotatable to manipulate the drive gear to move the cam between the retracted position and the extended position.

2. The apparatus of claim 1 wherein the hollow tube includes two pin apertures through the wall which are configured to be aligned with two aligned apertures of the receiver member.

3. The apparatus of claim 2 wherein two pins are carried by the hollow tube and are aligned with the two pin apertures through the wall of the hollow tube.

4. The apparatus of claim 2 wherein the two pin apertures through the wall of the hollow tube are disposed on opposite sides of the hollow tube.

5. The apparatus of claim 1 wherein the hollow tube has a rectangular cross-section.

6. The apparatus of claim 1 further comprising a cam biasing member coupled with the cam to resiliently bias the cam toward the extended position.

7. The apparatus of claim 6 wherein the cam biasing member comprises a spring coupled to the cam.

8. The apparatus of claim 1 wherein the at least one pin is resiliently biased by a pin biasing member inward into the channel.

9. The apparatus of claim 8 wherein the pin biasing member comprises a spring coupled to the at least one pin.

10. The apparatus of claim 1 further comprising a towing device member attached to the hollow tube.

11. An apparatus for attaching a towing device to a receiving member of a vehicle, the receiving member having at least two aligned apertures positioned on opposing sides thereof, the apparatus comprising:

a tubular shell having a wall, the shell having a channel therethrough, the shell further having a first aperture and a second aperture through the wall, the first aperture and the second aperture aligned and positioned on opposing sides of the shell, the tubular shell including a release knob aperture through the wall of the shell;

a first pin carried by the shell and within the channel, the first pin aligned with the first aperture of the shell;

a second pin carried by the shell and within the channel, the second pin aligned with the second aperture of the shell;

a cam having a first cam surface and a second cam surface disposed on opposite sides thereof, the first cam surface being slidably coupled with the first pin and the second cam surface being slidably coupled with the second pin, the cam being movable inside the channel of the shell between a retracted position and an extended position, the first cam surface slidably guiding the first pin to extend and protrude through the first aperture in the extended position, the second cam surface slidably guiding the second pin to extend and protrude through the second aperture in the extended position, the first cam surface slidably guiding the first pin to retract into the channel in the retracted position, the second cam surface slidably guiding the second pin to retract into the channel in the retracted position, wherein the shell is configured to be inserted into the receiving member of the vehicle to align the first and second apertures of the channel with two aligned apertures of the receiving member when the cam is in the retracted position with the first and second pins retracted into the channel, such that the first and second pins extend and protrude through the two aligned apertures of the receiving member which are aligned with the first and second apertures of the channel when the cam is in the extended position;

a drive gear and a gear rack operatively coupled with the drive gear, the gear rack being attached to the cam; and a release knob connected to the drive gear inside the channel of the shell and protruding through the release knob aperture to outside of the shell, the release knob comprising a turn knob connected to the drive gear, the turn knob being rotatable to manipulate the drive gear to move the cam between the retracted position and the extended position.

12. The apparatus of claim 11 further comprising a towing device member attached to the shell.

13. The apparatus of claim 12 further comprising means for resiliently biasing the cam toward the extended position.

14. The apparatus of claim 13 wherein the cam biasing means comprises a spring coupled between the towing device member and the cam.

15. The apparatus of claim 11 further comprising means for resiliently biasing the first and second pins inward into the channel.

16. The apparatus of claim 11 wherein the tubular shell has a rectangular cross-section.

* * * * *